United States Patent
Li et al.

(10) Patent No.: US 8,012,450 B2
(45) Date of Patent: Sep. 6, 2011

(54) METHOD FOR MAKING MESOPOROUS MATERIAL

(75) Inventors: Ya-Dong Li, Beijing (CN); Ding-Sheng Wang, Beijing (CN); Feng Bai, Beijing (CN); Zi-Yang Huo, Beijing (CN); Li-Ping Liu, Beijing (CN); Wei Chen, Beijing (CN)

(73) Assignees: Tsinghua University, Beijing (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 905 days.

(21) Appl. No.: 12/002,128

(22) Filed: Dec. 14, 2007

(65) Prior Publication Data
US 2010/0278721 A1     Nov. 4, 2010

(30) Foreign Application Priority Data
Apr. 6, 2007   (CN) .......................... 2007 1 0073980

(51) Int. Cl.
*C01G 53/04*     (2006.01)
(52) U.S. Cl. ....................................... 423/605
(58) Field of Classification Search .......................... None
See application file for complete search history.

(56) References Cited

U.S. PATENT DOCUMENTS
| | | | |
|---|---|---|---|
| 6,613,721 B1 * | 9/2003 | Kernizan et al. | 508/103 |
| 2002/0066401 A1 * | 6/2002 | Peng et al. | 117/68 |
| 2005/0271582 A1 * | 12/2005 | Barea et al. | 423/709 |

FOREIGN PATENT DOCUMENTS
| | | |
|---|---|---|
| CN | 1552547 A | 12/2004 |
| TW | 200426114 A | 12/2004 |
| TW | 200626730 A | 8/2006 |

OTHER PUBLICATIONS
Wang et al, synthesis and characterization of ordered hexagonal and cubic mesoporous tin oxides via mixed surfactant templates route, 2005, journal of colloid and interface science, 286, pp. 627-6731.*

* cited by examiner

*Primary Examiner* — Melvin Mayes
*Assistant Examiner* — Stefanie Cohen
(74) *Attorney, Agent, or Firm* — Altis Law Group, Inc.

(57) ABSTRACT

A method for making the mesoporous material includes the following steps: dissolving a nanocrystal powder in an organic solvent, and achieving a solution A with concentration of 1-30 mg/ml; dissolving a surfactant in water, and achieving a solution B with an approximate concentration of 0.002-0.05 mol/ml; mixing the solution A and the solution B in a volume ratio of 1:(5-30), and achieving a mixture; stirring and emulsifying the mixture, until an emulsion C is achieved; removing the organic solvent from the emulsion C, and achieving a deposit; washing the deposit with deionized water, and achieving a colloid; and drying and calcining the colloid, and eventually achieving a mesoporous material. The mesoporous material has a large specific surface area, a high porosity, and a narrow diameter distribution.

18 Claims, 5 Drawing Sheets

METHOD FOR MAKING MESOPOROUS MATERIAL

RELATED APPLICATIONS

This application is related to commonly-assigned, co-pending application: U.S. patent application Ser. No. 12/002,128, entitled "METHOD FOR MAKING MONODISPERSE SILVER AND SILVER COMPOUND NANOCRYSTALS", filed on Dec. 14, 2007 and U.S. patent application Ser. No. 12/002,190, entitled "METHOD FOR MAKING COLLOIDAL NANOCRYSTALS", filed on Dec. 14, 2007. The disclosure of the above-identified application is incorporated herein by reference.

BACKGROUND

1. Field of the Invention

The present invention relates to a method for making mesoporous materials.

2. Discussion of Related Art

The International Union of Pure and Applied Chemistry (IUPAC) classifies porosity on the basis of pore diameter. Mesoporous materials are defined by IUPAC as those materials in which the porosity is in the range of 2 nanometers (nm) to 50 nanometers. It is well known that the mesoporous materials have many virtues, such as small particles, high-surface area, and high porosity (in terms of volume percent). The control of particle microstructure allows control of the physical, chemical, and electronic properties. Such control is an important consideration in developing new functional materials, in the areas of, for example, catalysis, electronics, optics, photovoltaics, and energy storage. Therefore, the mesoporous materials, generally in the form of powders, have received enormous attention by various researchers since their announcement by Kresge et al. (Nature, 1992, 359, P 710-712).

Conventional methods for making the mesoporous materials include template methods, sol-gel methods, and hydrothermal methods. However, these conventional methods generally have complicated procedures associated therewith and low manageability and often require highly-toxic, special host materials.

However, there is ongoing demand for a general, simple, low toxicity, mass-production-friendly method for making mesoporous material.

SUMMARY OF THE INVENTION

A method for making the mesoporous material includes the following steps: dissolving a nanocrystal powder in an organic solvent, and achieving a solution A of a concentration of 1-30 mg/ml; dissolving a surfactant in water, and achieving a solution B of a concentration of 0.002-0.05 mol/ml; mixing the solution A and the solution B in a volume ratio of 1:(5-30), and achieving a mixture; stirring and emulsifying the mixture, until a emulsion C is achieved; removing the organic solvent for the emulsion C, and achieving a deposit; washing the deposit with deionized water after separated, and achieving colloid; and drying and calcining the colloid, and eventually achieving a mesoporous material.

Compared with the conventional method, the present method for making mesoporous material is simple and easy, and uses low toxic, general and cheap raw material, and thus the method is applicable in mass product. Further, the mesoporous material made by the present method has a large specific surface area, a high porosity, and a narrow diameter distribution and, therefore, can be widely used in catalysis, electronics, optics, photovoltaics, and energy storage.

BRIEF DESCRIPTION OF THE DRAWINGS

Many aspects of the present method can be better understood with reference to the following drawings. The components in the drawings are not necessarily to scale, the emphasis instead being placed upon clearly illustrating the principles of the present method.

Figure 1:
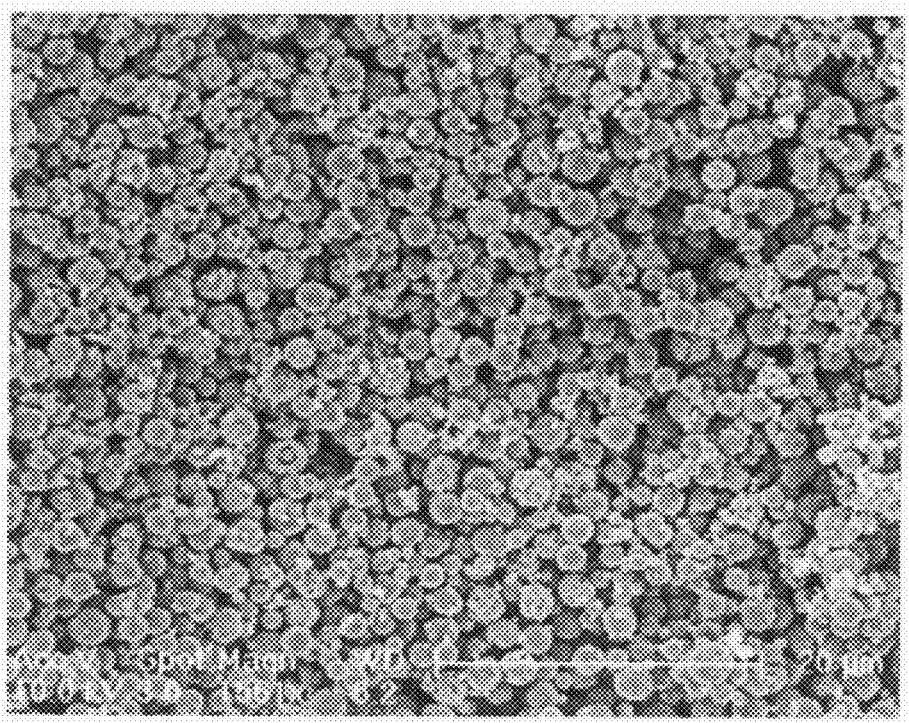
FIG. 1 is a scanning electron microscope (SEM) image of mesoporous nickel oxide, according to a first embodiment.

The exemplifications set out herein illustrate at least one preferred embodiment of the present method, in one form, and such exemplifications are not to be construed as limiting the scope of the invention in any manner.

DETAILED DESCRIPTION OF PREFERRED EMBODIMENTS

Reference will now be made, in detail, to the drawings to describe embodiments of the present method.

One method for making the mesoporous oxide includes the follows: (1) a nanocrystal powder coated with a certain ligand is dissolved in an organic solvent, and a solution A with concentration of 1-30 mg/ml is achieved; (2) a surfactant is dissolved in water, and a solution B with concentration of 0.002-0.05 mol/ml is achieved; (3) a volume ratio of 1:(5-30) mixture of the solution A and B is stirred and emulsified, until a uniform and stable emulsion C is achieved; (4) the organic solvent of emulsion C is removed, and a deposit is achieved; (5) the deposit is washed with deionized water after separated, and a colloid is achieved; and (6) the colloid is dried and calcined, and eventually a mesoporous material is achieved.

In step 1, the nanocrystal powder includes metal nanocrystal, oxide nanocrystal and metal fluoride nanocrystal. Additionally, the nanocrystal is in a shape of sphere, bar, sheet or cube; and has an approximate diameter of 0.5-100 nm. The ligand coating the nanocrystal is a material selected from the group consisting of oleic acid, oleyl amine, octadecyl amine, odecyl mercaptan, trioctylphosphine oxide, and triphenyl phosphine. The organic solvent is a material selected from the group consisting of cyclohexane, n-hexane, trichloromethane, and toluene.

In step 2, the surfactant can, advantageously, be an anionic surfactant, cationic surfactant, amphoteric surfactant, and/or nonionic surfactant.

In step 4, the organic solvent is removed by a heating process at about 40-95° C. for about 1-20 h, or by a reduced-pressure distillation process for about 1-20 h.

In step 6, the calcining process for the colloid includes the following substeps: in an inert gas, heating from room temperature to about 300-380° C. in about one hour; holding at temperature for one hour; heating up to 450-530° C. in about one hour; holding at temperature for about one hour; and then cooling down to room temperature.

The present method is further illustrated by the following examples, which are not to be construed in any way as imposing limitation upon the scope thereof.

Example 1

A nickel oxide (NiO) nanocrystal coated with octadecyl amine is provided. The NiO nanocrystal has a diameter of about 20 nm, and a dispersing coefficient thereof is 10%. The NiO nanocrystal is dissolved in an organic solvent of cyclohexane, and a cyclohexane solution with concentration of about 10 mg/ml is achieved. A surfactant of sodium lauryl sulfate (SDS) of 300 mg is dissolved in a solvent of deionized water of 100 ml, and a water solution with a concentration of about 0.01 mol/ml is achieved. 10 ml of cyclohexane solution is mixed with 100 ml of water solution, further emulsified by ultrasonic method, until a uniform and stable emulsion is achieved. Thereafter, the emulsion is heated at 80° C. for 2 h by water heating method, in order to remove the organic solvent therefrom, and a deposit is achieved. The deposit is washed with deionized water after separation, and a NiO colloid is achieved. Then, the NiO colloid is dried at 60° C. and further calcined in an argon gas, and eventually a mesoporous NiO is achieved. The calcining process includes the following substeps: heating from room temperature to 350° C. in one hour; holding at temperature for one hour; heating up to 450° C. in one hour; holding at temperature for one hour; and then cooling down to room temperature.

Figure 2:
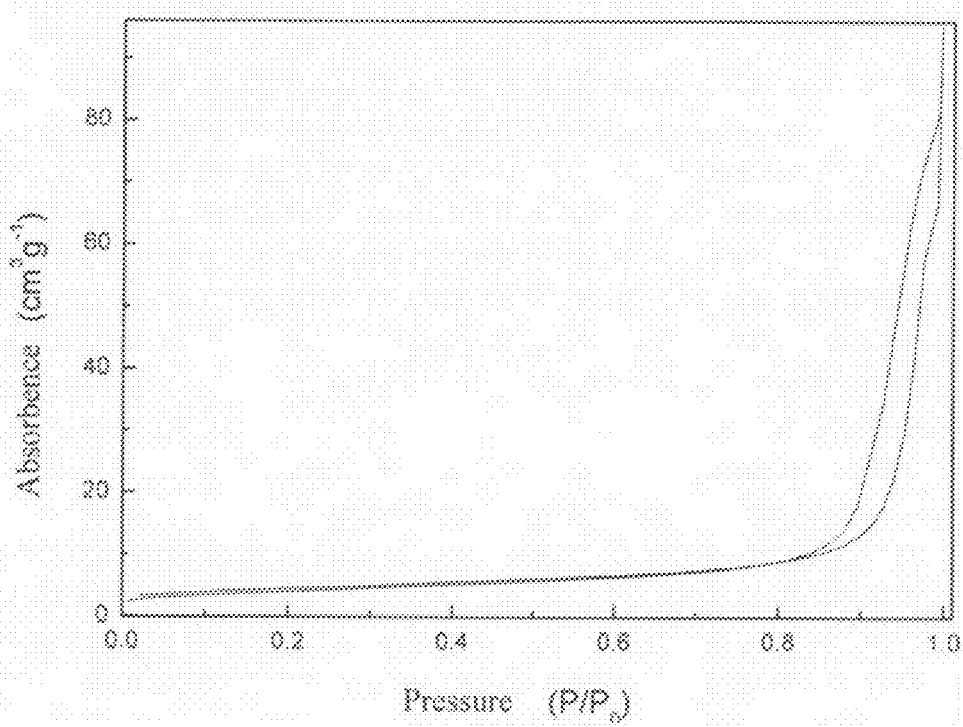
FIG. 2 is an adsorption-desorption isothermal curve of mesoporous nickel oxide, according to a first embodiment.
Figure 3:
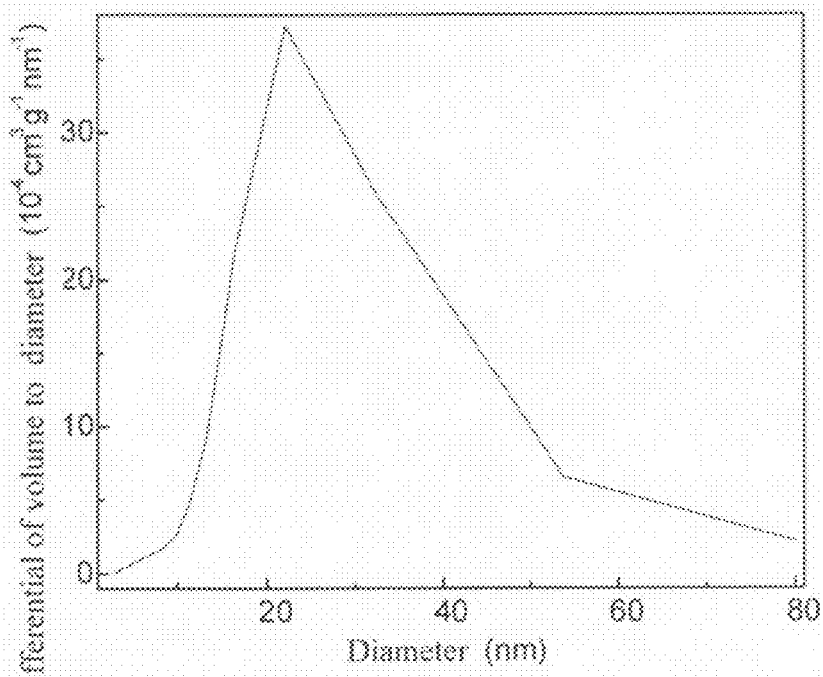
FIG. 3 is a pore diameter distribution curve of mesoporous nickel oxide, according to a first embodiment.

Referring to FIG. 1, the mesoporous NiO, according to the first embodiment, has a well-ordered configuration, a porosity of about 0.09 cm$^3$/g, and a specific surface area of about 16.1 m2/g. Referring to FIG. 2, the mesoporous NiO is a mesoporous material. Referring to FIG. 3, the mesoporous NiO has a uniform diameter distribution in a range of about 25 nm.

Example 2

A mangano-manganic oxide (Mn3O4) nanocrystal coated with octadecyl amine is provided. The Mn3O4 nanocrystal has a diameter of about 10 nm, and a dispersing coefficient thereof is about 12%. The Mn3O4 nanocrystal is dissolved in an organic solvent of cyclohexane, and a cyclohexane solution with concentration of about 10 mg/ml is achieved. A surfactant of SDS of 300 mg is dissolved in a solvent of deionized water of 100 ml, and a water solution with a concentration of about 0.01 mol/ml is achieved. 10 ml of cyclohexane solution is mixed with 100 ml of water solution and further emulsified by an ultrasonic method, until a uniform and stable emulsion is achieved. Thereafter, the emulsion is heated at 80° C. for 2 h by a heating method, in order to remove the organic solvent therefrom, and a deposit is thus achieved. The deposit is washed with deionized water after separation, and an Mn3O4 colloid is achieved. Then, the Mn3O4 colloid is dried at 60° C. and further calcined in an argon gas, and eventually a mesoporous MnO is achieved. The calcining process includes the following substeps: heating from room temperature to 350° C. in one hour; holding at temperature for one hour; heating up to 500° C. in one hour; holding at temperature for one hour; and then cooling down to room temperature.

Figure 4:
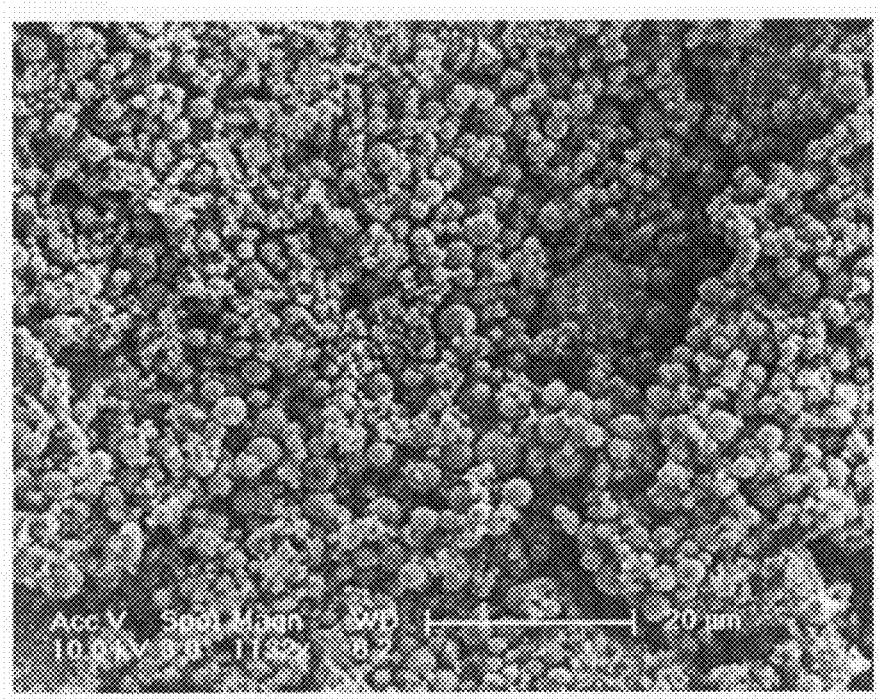
FIG. 4 is an SEM image of mesoporous manganese oxide, according to a second embodiment.
Figure 5:
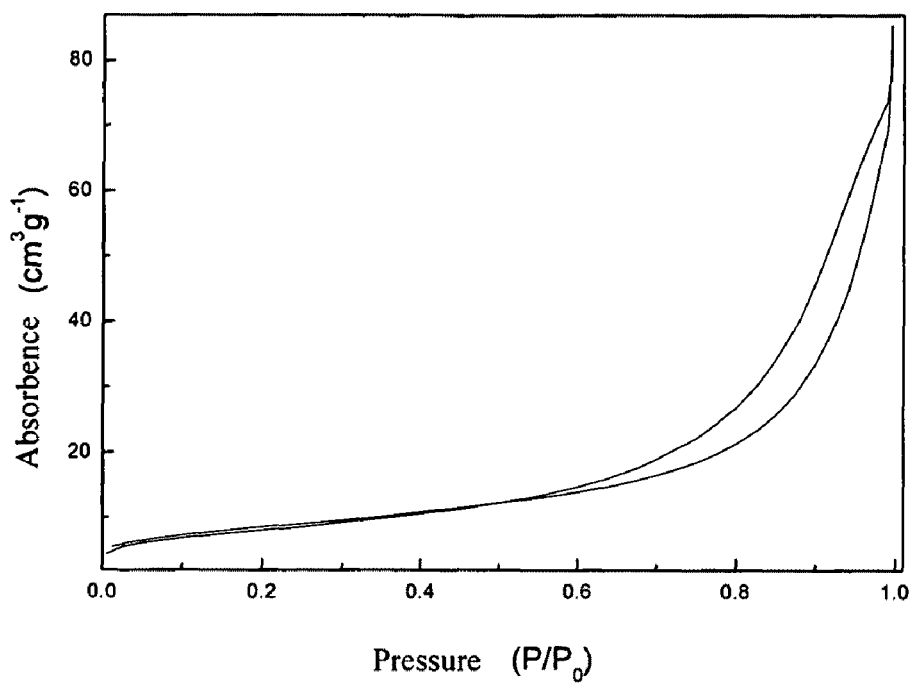
FIG. 5 is an adsorption-desorption isothermal curve of mesoporous manganese oxide, according to a second embodiment.
Figure 6:
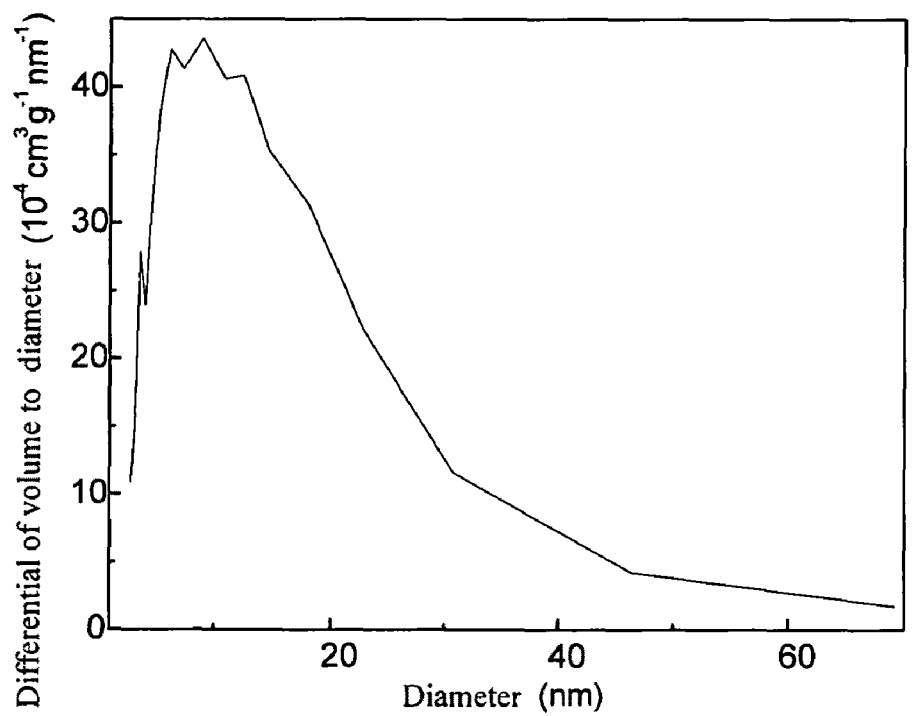
FIG. 6 is a pore diameter distribution curve of mesoporous manganese oxide, according to a second embodiment.

Referring to FIG. 3, the mesoporous MnO according to the second embodiment has a well-ordered configure, a porosity thereof is about 0.1 cm$^3$/g, and a specific surface area thereof is about 30.6 m2/g. Referring to FIG. 4, the mesoporous MnO is a mesoporous material. Referring to FIG. 5, the mesoporous MnO has a uniform diameter distribution in a range of about 10 nm.

Example 3

A cobaltous oxide (CoO) nanocrystal coated with octadecyl amine is provided. The CoO nanocrystal has a diameter of about 150 nm and a dispersing coefficient thereof is about 20%. The CoO nanocrystal is dissolved in an organic solvent of cyclohexane, and a cyclohexane solution with concentration of about 10 mg/ml is achieved. A surfactant of SDS of 300 mg is dissolved in a solvent of deionized water of 100 ml, and a water solution with a concentration of about 0.01 mol/ml is achieved. 10 ml of cyclohexane solution is mixed with 100 ml of water solution and further emulsified by an ultrasonic method, until a uniform and stable emulsion is achieved. Thereafter, the emulsion is heated at 80° C. for 2 h by water heating method, in order to removing the organic solvent therefrom, and a deposit is achieved. The deposit is washed with deionized water after separation, and a CoO colloid is achieved. Then, the CoO colloid is dried at 60° C. and further calcined in an argon gas, and eventually a mesoporous CoO is achieved. The calcining process includes the following substeps: heating from room temperature to 350° C. in one hour; holding at temperature for one hour; heating up to 500° C. in one hour; holding at temperature for one hour; and then cooling down to room temperature.

Figure 7:
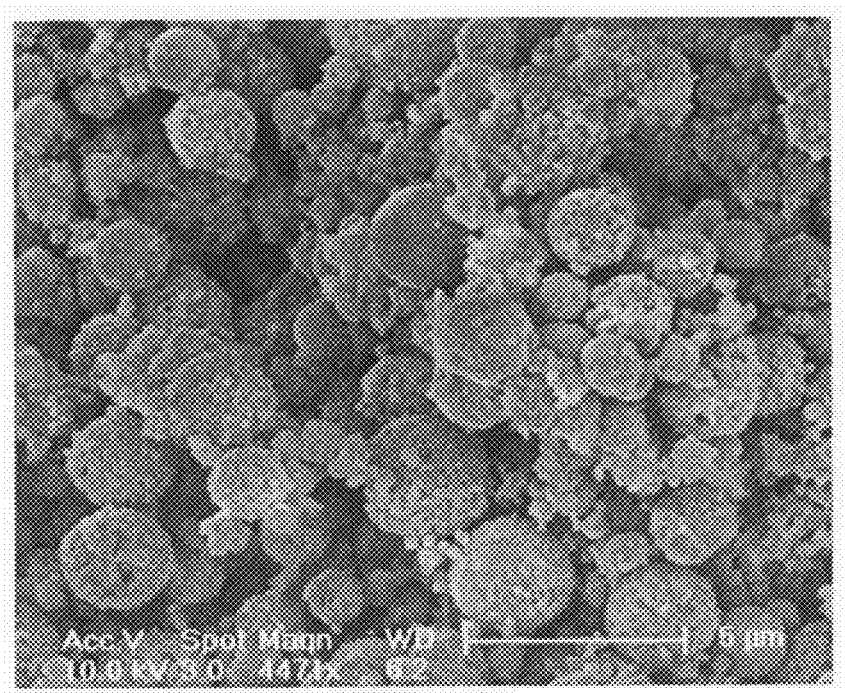
FIG. 7 is an SEM image of mesoporous cobaltous oxide, according to a third embodiment.
Figure 8:
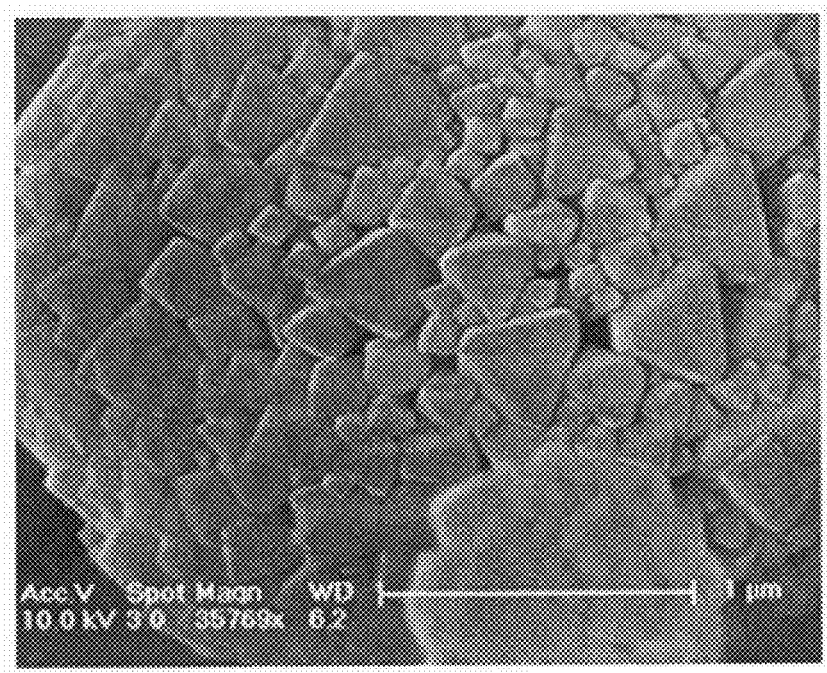
FIG. 8 is an enlarged SEM image of FIG. 7.
Figure 9:
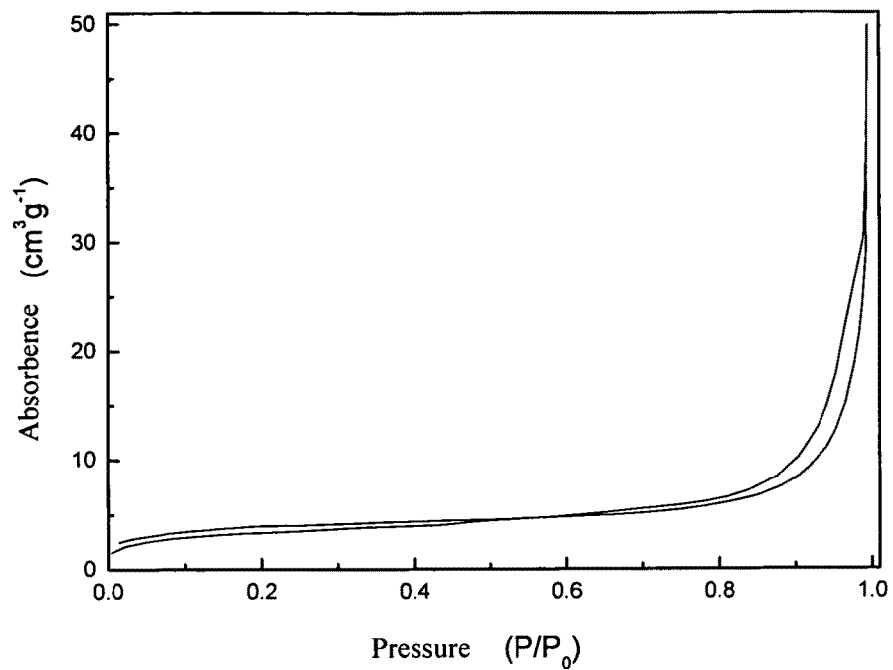
FIG. 9 is an adsorption-desorption isothermal curve of mesoporous cobalt oxide, according to a third embodiment.
Figure 10:
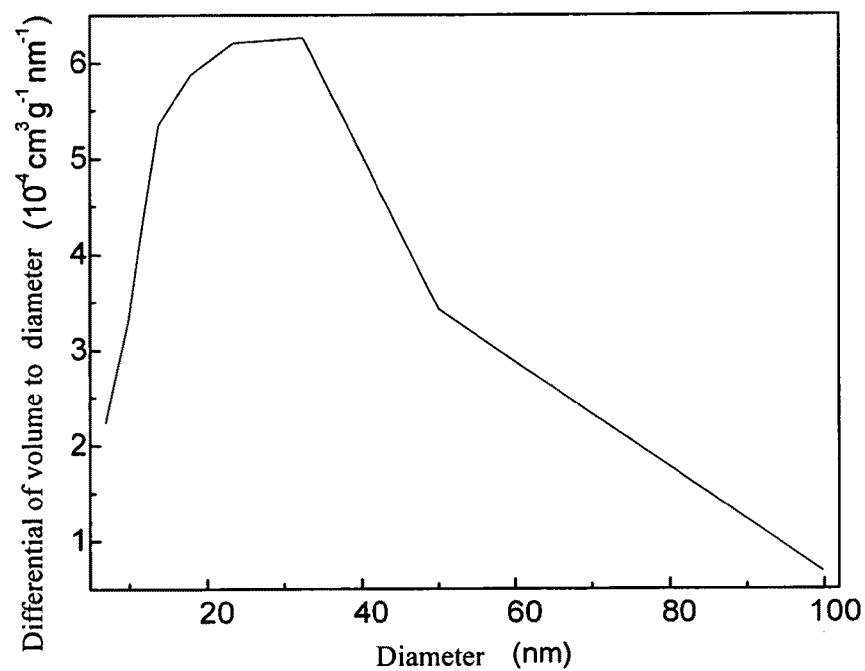
FIG. 10 is a pore diameter distribution curve of mesoporous cobalt oxide, according to a third embodiment.

Referring to FIGS. 7 and 8, the mesoporous CoO, according to the third embodiment, has a well-ordered configuration, a porosity thereof is about 0.03 cm$^3$/g, and a specific surface area thereof is about 14.4 m2/g. Referring to FIG. 9, the mesoporous CoO is a mesoporous material. Referring to FIG. 10, the mesoporous MnO has a uniform diameter distribution in a range of about 30 nm.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. A method for making a mesoporous material comprising:
    (1) dissolving a nanocrystal powder coated with a ligand in an organic solvent, and achieving a first solution with a concentration of about 1 mg/ml to about 30 mg/ml;
    (2) dissolving a surfactant in water, and achieving a second solution with an approximate concentration of about 0.002 mol/ml to about 0.05 mol/ml;
    (3) mixing the first solution and the second solution in a volume ratio of about 1:5 to about 1:30, and achieving a mixture;
    (4) stirring and emulsifying the mixture, until an emulsion is achieved;
    (5) removing the organic solvent from the emulsion, and achieving a deposit;
    (6) washing the deposit with deionized water, to obtain a colloid; and (7) drying and calcining the colloid to form the mesoporous material.

2. The method for making the mesoporous material as claimed in claim 1, wherein in step (4), the step of emulsifying the mixture is selected from the group consisting of a high-speed stirring method, an ultrasonic method, and a colloid milling method.

3. The method for making the mesoporous material as claimed in claim 1, wherein in step (5), the organic solvent is removed by heating the emulsion at approximately 40 centigrade degrees to about 95 centigrade degrees for about 1 hour to about 20 hours.

4. The method for making the mesoporous material as claimed in claim 1, wherein in step (5), the organic solvent is removed by a reduced pressure distillation process for about 1 hour to about 20 hours.

5. The method for making the mesoporous material as claimed in claim 1, wherein in step (7), the step of calcining the colloid further comprises: heating the colloid from room temperature to a first temperature of approximately 300 centigrade degrees to about 380 centigrade degrees in about one hour in an inert gas; holding at the first temperature for about one hour; heating up to a second temperature of about 450 centigrade degrees to about 530 centigrade degrees in about one hour; holding at the second temperature for about one hour; and then cooling down to room temperature.

6. The method for making the mesoporous material as claimed in claim 1, wherein the mesoporous material has a diameter of about 10 nm to about 50 nm.

7. The method for making the mesoporous material as claimed in claim 1, wherein the nanocrystal powder is in a shape of sphere, bar, sheet, or cube; and has a diameter of about 0.5 nm to about 100 nm.

8. The method for making the mesoporous material as claimed in claim 1, wherein the nanocrystal powder is at least one of a metal nanocrystal, an oxide nanocrystal, and a metal fluoride nanocrystal.

9. The method for making the mesoporous material as claimed in claim 1, wherein a material of the ligand is selected from the group consisting of oleic acid, oleyl amine, octadecyl amine, odecyl mercaptan, trioctylphosphine oxide, and triphenyl phosphine.

10. The method for making the mesoporous material as claimed in claim 1, wherein the organic solvent is selected from the group consisting of cyclohexane, n-hexane, trichloromethane and toluene.

11. The method for making the mesoporous material as claimed in claim 1, wherein the surfactant comprises at least one of an anionic surfactant, a cationic surfactant, an amphoteric surfactant, and a nonionic surfactant.

12. The method for making the mesoporous material as claimed in claim 1, wherein the nanocrystal is metal nanocrystal, oxide nanocrystal, or metal fluoride nanocrystal.

13. The method for making the mesoporous material as claimed in claim 12, wherein the ligand is oleic acid, oleyl amine, octadecyl amine, odecyl mercaptan, trioctylphosphine oxide, or triphenyl phosphine.

14. The method for making the mesoporous material as claimed in claim 1, the nanocrystal is mangano-manganic oxide nanocrystal, cobaltous oxide crystal, or nickel oxide.

15. The method for making the mesoporous material as claimed in claim 14, the ligand is octadecyl amine.

16. A method for making a mesoporous material, the method comprising:
    dissolving a nanocrystal powder coated with a ligand in an organic solvent, to achieve a first solution;
    dissolving a surfactant in water, to form a second solution;
    mixing the first solution and the second solution, and forming an emulsion;
    removing the organic solvent from the emulsion to obtain a colloid; and
    drying and calcining the colloid to form the mesoporous material.

17. The method for making the mesoporous material as claimed in claim 16, wherein the ligand is oleic acid, oleyl amine, octadecyl amine, odecyl mercaptan, trioctylphosphine oxide, or triphenyl phosphine.

18. The method for making the mesoporous material as claimed in claim 17, wherein the surfactant is sodium lauryl sulfate.

* * * * *